United States Patent
Betancourt et al.

(10) Patent No.: US 6,883,526 B1
(45) Date of Patent: Apr. 26, 2005

(54) METHOD OF USING A COOLER FLUSHER

(75) Inventors: Eduardo Betancourt, Long Beach, CA (US); John Rome, Huntington Beach, CA (US)

(73) Assignee: Motorvac Technologies, Inc., Santa Ana, CA (US)

( * ) Notice: Subject to any disclaimer, the term of this patent is extended or adjusted under 35 U.S.C. 154(b) by 0 days.

(21) Appl. No.: 10/401,926

(22) Filed: Mar. 27, 2003

Related U.S. Application Data

(62) Division of application No. 09/688,552, filed on Oct. 16, 2000, now Pat. No. 6,539,958.

(51) Int. Cl.[7] .................................................. B08B 9/00
(52) U.S. Cl. ..................... 134/22.1; 134/10; 134/22.18; 134/26; 134/34
(58) Field of Search .............................. 134/22.1, 22.12, 134/22.18, 26, 10, 34, 22.11

(56) References Cited

U.S. PATENT DOCUMENTS

| | | | | |
|---|---|---|---|---|
| 1,892,093 A | * | 12/1932 | Bettistella | ..................... 134/10 |
| 2,665,772 A | | 1/1954 | Greer et al. | |
| 3,926,036 A | | 12/1975 | Bower | |
| 3,951,185 A | | 4/1976 | Bower et al. | |
| 4,606,363 A | | 8/1986 | Scales | |
| 5,289,837 A | | 3/1994 | Betancourt | |
| 5,370,160 A | * | 12/1994 | Parker | .......................... 141/98 |
| 5,385,613 A | | 1/1995 | Coleman | |
| 5,392,796 A | | 2/1995 | Coleman | |
| 5,443,085 A | | 8/1995 | Huddas | |
| 5,447,184 A | * | 9/1995 | Betancourt | .................... 141/98 |
| 5,485,857 A | | 1/1996 | Amundsen | |
| 6,213,133 B1 | * | 4/2001 | Reicks | ....................... 134/22.1 |
| 6,263,889 B1 | | 7/2001 | Flynn et al. | |
| 6,341,612 B1 | | 1/2002 | Duckett et al. | |
| 6,379,540 B1 | | 4/2002 | Reicks | |

* cited by examiner

*Primary Examiner*—Frankie L. Stinson
*Assistant Examiner*—Saeed Chaudhry
(74) *Attorney, Agent, or Firm*—Farjami & Farjami LLP

(57) ABSTRACT

There is provided methods for servicing a vehicle's transmission cooling system having inlet and outlet ports. An example method comprises the steps of pumping air into an inlet port of the transmission cooling system to cause transmission fluid to flow out of the outlet port of the transmission cooling system; cycling a solvent through the transmission cooling system, where the solvent enters through the inlet port and exits through the outlet port of the transmission cooling system; re-cycling the solvent exiting through the output port through the transmission cooling system; and pumping air into the inlet port to cause the solvent in the transmission cooling system to exit through the outlet port.

12 Claims, 4 Drawing Sheets

METHOD OF USING A COOLER FLUSHER

The present application is a divisional application of U.S. application Ser. No. 09/688,552, filed Oct. 16, 2000, now U.S. Pat. No. 6,539,958 which is hereby fully incorporated by reference in the present application.

BACKGROUND OF THE INVENTION

1. Field of the Invention

The present invention relates to the field of vehicle maintenance and repair. More specifically, the invention is directed to servicing transmission cooling systems.

2. Related Art

It is common for vehicles with automatic transmissions to have a cooling system for the transmission fluid in order to keep the operating temperature of the transmission within a desired range. Most cars, especially larger models, have such a transmission cooling system. Most trucks and vans require a larger transmission cooling system to handle extra stress placed on the transmission by, for example, carrying heavy loads or towing trailers. A typical transmission cooling system is connected to the transmission in such a way that transmission fluid is circulated from the transmission to a transmission fluid cooler through one line, then circulated through the transmission fluid cooler, and returned to the transmission through a second line.

A transmission cooling system can include, for example, a transmission fluid cooler inside the vehicle's radiator, so that the transmission fluid cooler is immersed in the engine coolant inside the radiator. Thus, engine coolant, typically a combination of water and antifreeze, flows over the outside of the transmission fluid cooler while transmission fluid flows on the inside of the transmission fluid cooler. Heat is transferred from the transmission fluid circulating inside the transmission fluid cooler to the engine coolant circulating outside the transmission fluid cooler. Air flow over the outside of the radiator cools the engine coolant. Other cooling devices may also be used, for example, a called a "heat exchanger" may be used in conjunction with or instead of the transmission fluid cooler described above. The transmission fluid cooler is also sometimes referred to as a transmission "oil cooler." A common design among all these devices is that each circulates fluid from the transmission through the device, in order to cool the fluid, and then returns the cooled fluid to the transmission. Thus, in a transmission cooling system, transmission fluid is circulated from the vehicle's transmission system, through a transmission fluid cooler which controls the temperature of the transmission fluid, and returns to circulate through the transmission, thereby keeping the transmission within desired operating temperature range.

For various reasons such as extended use of the vehicle or transmission failure, the transmission fluid can become "dirty" or contaminated with debris, for example, metal flakes from worn parts inside the transmission. Such debris can accumulate inside the transmission cooling system, in particular, inside the transmission cooler causing it to "clog" or become incapable of sufficient circulation of transmission fluid to provide adequate cooling. Occasionally, a transmission cooler becomes so clogged that it must be replaced. Transmission cooling system clogging can also lead to premature transmission failure. It is, therefore, crucial to clean the transmission cooling system as part of normal periodic transmission servicing. In addition, when a transmission is removed to be rebuilt or replaced with a new or rebuilt transmission, the transmission cooling system is typically cleaned to avoid contamination of the reinstalled transmission.

A number of conventional means are available for cleaning transmission cooling systems. One conventional means uses a pressurized container containing a liquid cleaner, for example, a can containing compressed solvent. Use of such means has many disadvantages. For example, the amount of cleaning that can be performed is limited by the amount of solvent and the can pressure, which may require the use and expense of extra cans. In addition, the cleaning liquid is only used once, which is wasteful because cleaning liquid is typically not completely dirty after only one use and can be used again. Disposing cleaning liquid which is capable of being reused is not only wasteful, but is also harmful to the environment.

Another disadvantage of using a compressed solvent can is that it does not provide a measure of the effectiveness of the cleaning. As a result, a transmission fluid cooler, which appears to have been cleaned may still be incapable of sufficient circulation of transmission fluid to provide adequate cooling, but may be reused and cause transmission overheating and damage.

Other conventional methods of cleaning transmission cooling systems may use air pressure. A source of such air pressure may be a pressurized system of air hoses commonly found in auto repair shops, typically referred to as "shop air," typically at a pressure of 100.0 to 120.0 pounds per square inch ("psi"). Use of such methods is disadvantageous in that shop air may not be available at the location where the vehicle is to be serviced. Further, high air pressure can present safety concerns for the operators. In addition, shop air methods suffer from other disadvantages, such as using the cleaning liquid only once, which is wasteful because cleaning liquid is typically not completely dirty after only one use and can be used again. As stated above, such wastefulness is also harmful to the environment.

Accordingly, there is an intense need in the art for a new cooler flusher method and apparatus that can overcome the disadvantages and drawbacks in the conventional art; that can improve cost, efficiency, and safety; and that can remove environmental concerns.

SUMMARY OF THE INVENTION

In accordance with the purpose of the present invention as broadly described herein, there is provided method and apparatus for servicing a vehicle's transmission cooling system.

In one aspect of the present invention, a service apparatus, for servicing a vehicle's transmission cooling system, includes a source valve with inlet and outlet ports, a pump with inlet and outlet ports, and a return valve with inlet and outlet ports. The pump inlet is connected to the source valve outlet. The pump pumps fluid from the source valve inlet through the source valve outlet and the pump inlet to the pump outlet for servicing the transmission cooling system. The fluid returns from the return valve inlet to the return valve outlet and the pump then re-pumps the fluid into the transmission cooling system.

In another aspect, the service apparatus further includes a fluid source and a filter interposed between the fluid source and the source valve. In yet another aspect, the fluid returns to the fluid source prior to re-pumping the fluid. In one aspect, the service apparatus also includes a flowmeter interposed between the return valve and the fluid source and a filter interposed between the return valve and the flowmeter.

In one aspect of the present invention, the source valve inlet may also function as an air inlet. In yet another aspect, the source valve includes an air inlet and the return valve includes a waste outlet.

The service apparatus of the present invention can be used to perform a service method comprising the steps of pumping air into an inlet port of transmission cooling system to cause transmission fluid to flow out of an outlet port of the transmission cooling system; cycling a solvent through the transmission cooling system, where the solvent enters through the inlet port and exits through the outlet port of the transmission cooling system; re-cycling the solvent exiting through the output port through the transmission cooling system; and pumping air into the inlet port to cause the solvent in the transmission cooling system to exit through the outlet port.

These and other aspects of the present invention will become apparent with further reference to the drawings and specification, which follow.

DETAILED DESCRIPTION OF THE INVENTION

The following description contains specific information pertaining to the implementation of the present invention. One skilled in the art will recognize that the present invention may be implemented in a manner different from that specifically discussed in the present application. Moreover, some of the specific details of the invention are not discussed in order to not obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

Figure 1A:
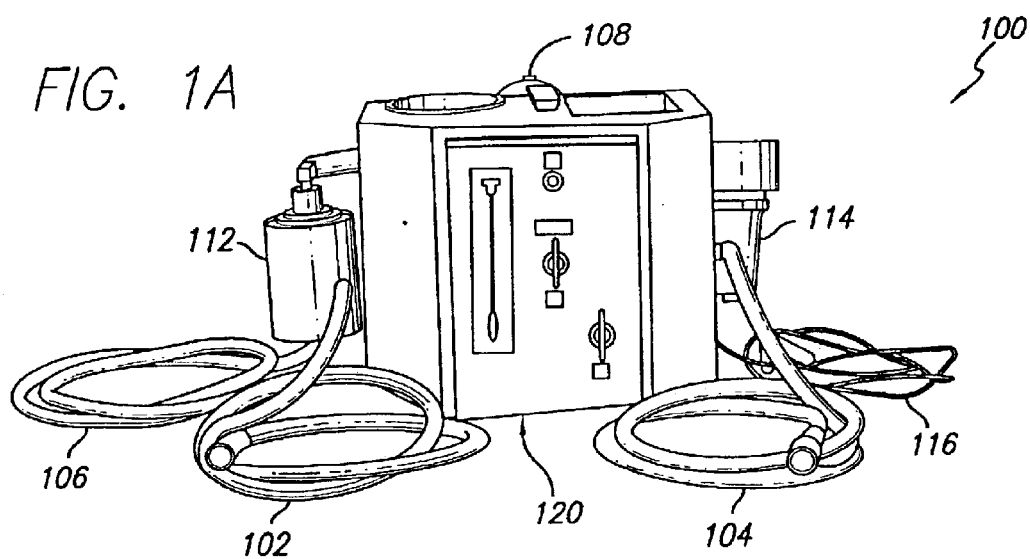
FIG. 1A illustrates a front view of a cooler flusher system according to one embodiment of the present invention.
Figure 1B:
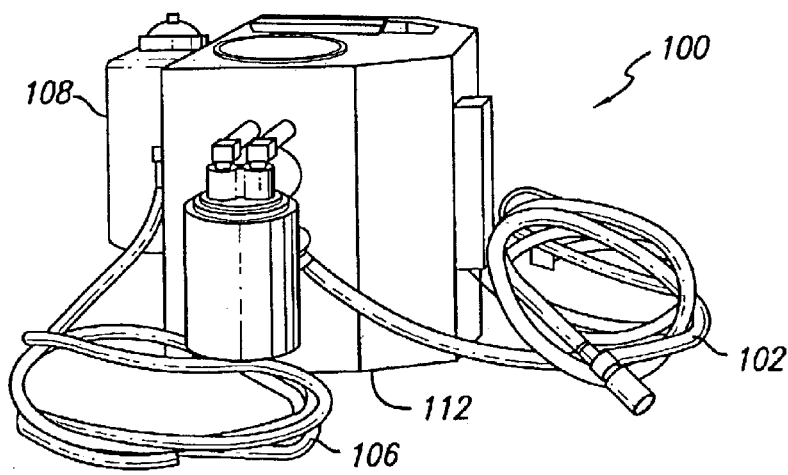
FIG. 1B illustrates a left side view of the cooler flusher system of FIG. 1A.
Figure 1C:
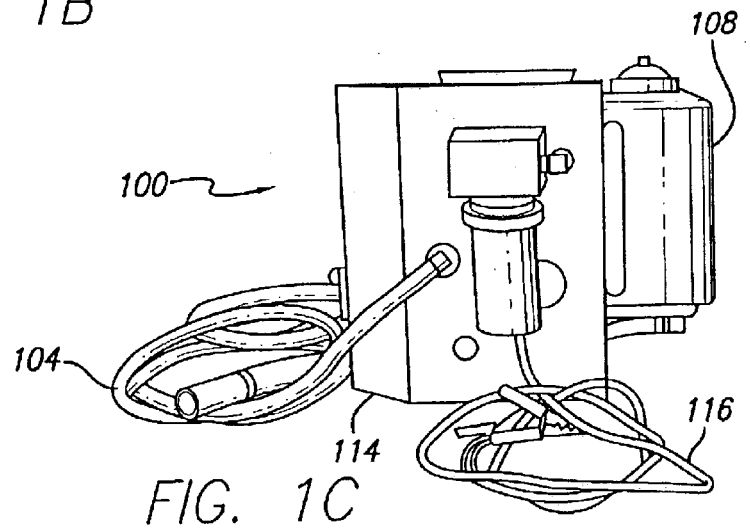
FIG. 1C illustrates a right side view of the cooler flusher system of FIG. 1A.

FIG. 1A shows a cooler flusher system according to one embodiment of the present invention. FIGS. 1A, 1B, and 1C show cooler flusher system 100 from the front and also from a left side view and a right side view for greater clarity. As shown in FIG. 1A, cooler flusher system 100 includes pressure hose 102 for delivering solvent or air under pressure to a transmission cooling system (not shown). Pressure is supplied from a pump internal to cooler flusher system 100, discussed in more detail below with reference to FIG. 2. The solvent can be, for example, mineral spirits or commercially available biodegradable soap-like solution, or any other suitable cleaning fluid. Cooler flusher system 100 also includes return hose 104 for the return of fluid, either transmission fluid or solvent, from the transmission cooling system. The fluid returned from the transmission cooling system through return hose 104 can be directed to waste hose 106 or to fluid tank 108. Contaminated fluid, for example, debris-laden transmission fluid, is directed through waste hose 106 to a receptacle for disposal. Reusable fluid, for example, solvent, is directed to fluid tank 108.

Cooler flusher system 100 further includes filters 112 and 114. Filter 112 filters solvent before it is delivered to pressure hose 102. Filter 112 can be a relatively fine filter, i.e. one which traps all particles greater than some small size, such as a paper filter or a fine screen mesh. Filter 114 filters solvent after it is returned through return hose 104. Filter 114 can be a relatively coarse filter, i.e. one which traps particles of greater size than the paper filter is designed for, such as a screen filter. The purpose of filter 114 is to provide a filter that is less susceptible to clogging and which, therefore, needs cleaning or replacing less often. Further, filter 114 filters out larger size particles from the solvent stream that passes through filter 112. Filters 112 and 114 will keep the solvent clean for longer use and prevent premature failure of cooler flusher system 100. Cooler flusher system 100 also includes power cables 116 for supplying power to the pump. Cooler flusher system 100 also includes front panel 120.

Figure 1D:
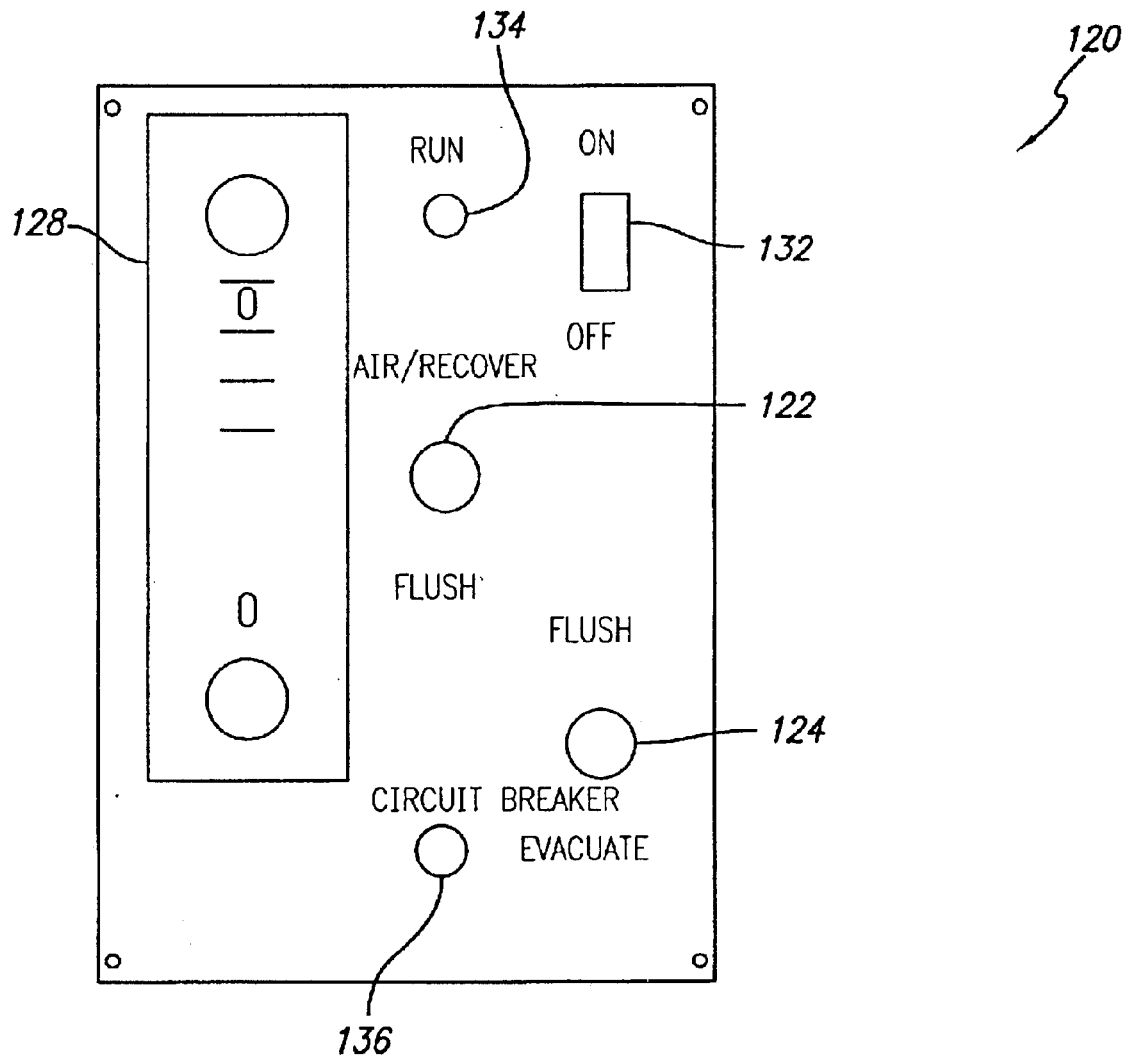
FIG. 1D illustrates an example control panel of the cooler flusher system of FIG. 1A.

Referring now to FIG. 1D, front panel 120 of FIG. 1A is shown in more detail. As seen in FIG. 1D, front panel 120 includes source valve 122 for directing flow to pressure hose 102 from either of fluid tank 108 or an air inlet check valve (not shown in FIG. 1D). Source valve 122 is also provided with an "off" position which prevents flow through source valve 122. Front panel 120 also includes return valve 124 for directing flow from return hose 104 to either of waste hose 106 or fluid tank 108. Return valve 124 is also provided with an "off" position which prevents flow through return valve 124. Front panel 120 also includes flow meter 128 for measuring flow of fluid through the transmission cooling system. FIG. 1D also shows that control panel 120 includes power switch 132, indicator light 134, and circuit breaker 136. Power switch 132, indicator light 134, and circuit breaker 136 are discussed in more detail below with reference to FIG. 4.

Figure 2:
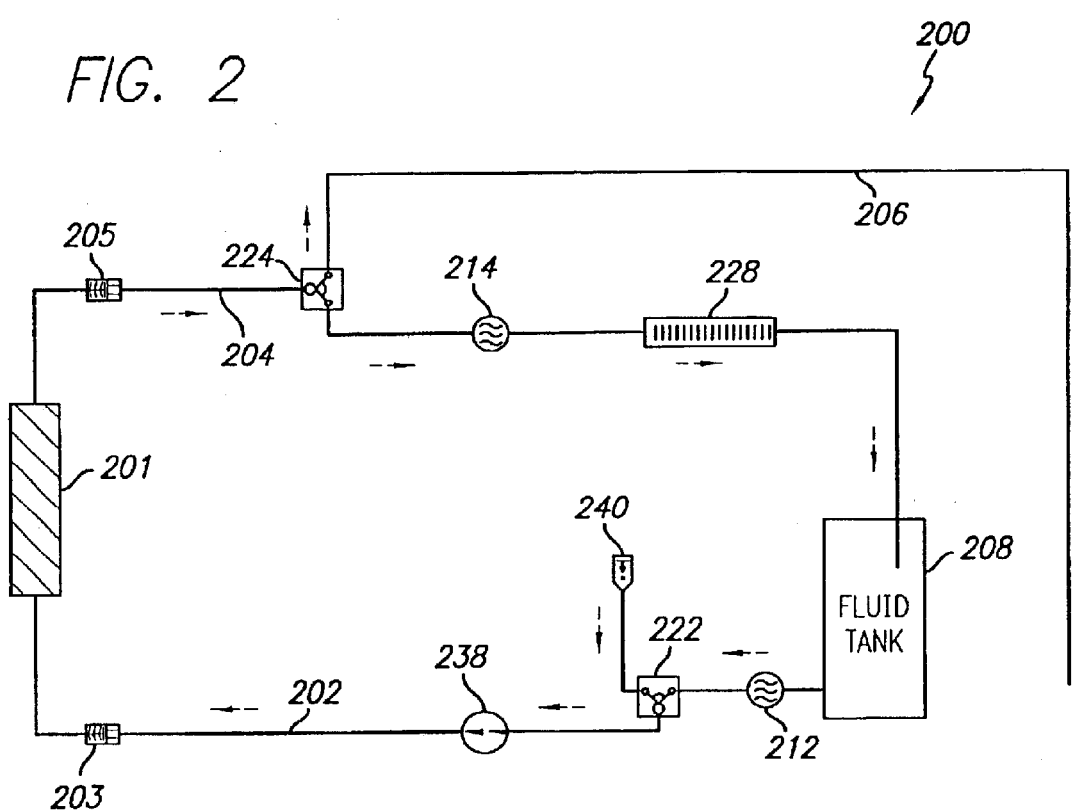
FIG. 2 illustrates a fluid flow schematic diagram of the cooler flusher system of FIG. 1A.

Flow diagram 200 of FIG. 2 illustrates pressure hose 202 of cooler flusher system 100 connected to transmission cooling system 201 via, hydraulic connector 203. Return hose 204 of cooler flusher system 100 is connected to transmission cooling system 201 via hydraulic connector 205. Hydraulic connectors 203 and 205 can be standard connectors as known in the art or other means such as hoses and clamps. Pressure hose 202 can be any hose capable of supporting the pressure delivered by pump 238. For example, typical pressure is in the range of approximately 15.0 psi (pounds per square inch) to 50.0 psi. Return hose 204 may be any suitable hose for returning transmission fluid or solvent from transmission cooling system 201.

Return hose 204 delivers fluid to return valve 224 for directing flow from return hose 204 to either of waste hose 206 or fluid tank 208. For example, return valve 224 can be a three-way valve with an "off" position, an "evacuate" position, and a "flush" position. In one embodiment, the three-way valve may include one inlet port and two outlet ports. As shown, the inlet port of return valve 224 may receive fluid from transmission cooling system 201, which fluid may then flow out of either of the outlet ports depending on the position of return valve 224. The "off" position can be used to prevent all flow through valve 224; the "evacuate" position can be used to direct flow from return hose 204 to waste hose 206 when removing transmission fluid from transmission cooling system 201; and the "flush" position can be used to direct flow from return hose 204 to fluid tank 208 when pumping solvent from fluid tank 208, through transmission cooling system 201, and back to fluid tank 208. Waste hose 206 can be any suitable hose for delivering transmission fluid from return valve 224 to a waste or recycling receptacle. Fluid tank 208 can be any suitable container for holding the solvent or other cleaning fluid used to clean transmission cooling system 201.

In one embodiment, filter 214 and flow meter 228 are interposed between return valve 224 and fluid tank 208. For example, filter 214 can be a screen filter for filtering coarse size particles from the solvent as discussed above. Flow meter 228 can be any device capable of measuring the flow of solvent through transmission cooling system 201 and providing a satisfactory read out to an operator.

Continuing with FIG. 2, flow diagram 200 shows source valve 222 for directing flow to pump 238 from either of fluid tank 208 or check valve 240. For example, source valve 222 can be a three-way valve with an "off" position, an "air/recover" position, and a "flush" position. In one embodiment, the three-way valve may include two inlet ports and an outlet port, where one inlet may provide air and the other provide liquid or fluid. As shown, the outlet port of source valve 222 is connected to an inlet of pump 238, which can pump fluid or air from inlet of pump 238 to an outlet of pump 238. The "off" position can be used to prevent all flow through source valve 222; the "air/recover" position can be used to direct air flow from check valve 240 to pump 238 when removing transmission fluid from transmission cooling system 201; and the "flush" position can be used to direct liquid flow from fluid tank 208 to pump 238 when pumping solvent from fluid tank 208, through transmission cooling system 201, and back to fluid tank 208. Check valve 240 can be any suitable one-way flow device for allowing a flow of air into source valve 222 and preventing any backflow of fluid from source valve 222 and out of cooler flusher system 100. Thus, the "air/recover" position of source valve 222 can be used to direct a flow of air from check valve 240 to pump 238 when removing transmission fluid from transmission cooling system 201. In an alternative mode of operation, the "flush" position of source valve 222 can be used to direct a flow of solvent from fluid tank 208 to pump 238 when removing larger amount of transmission fluid from transmission cooling system 201.

Flow diagram 200 further shows pump 238 for supplying pressure for flow of air or fluid through cooler flusher system 100 and transmission cooling system 201. In one embodiment, filter 212 is interposed between fluid tank 208 and source valve 222. For example, filter 212 can be a paper filter for filtering fine size particles from the solvent as discussed above.

Figure 3:
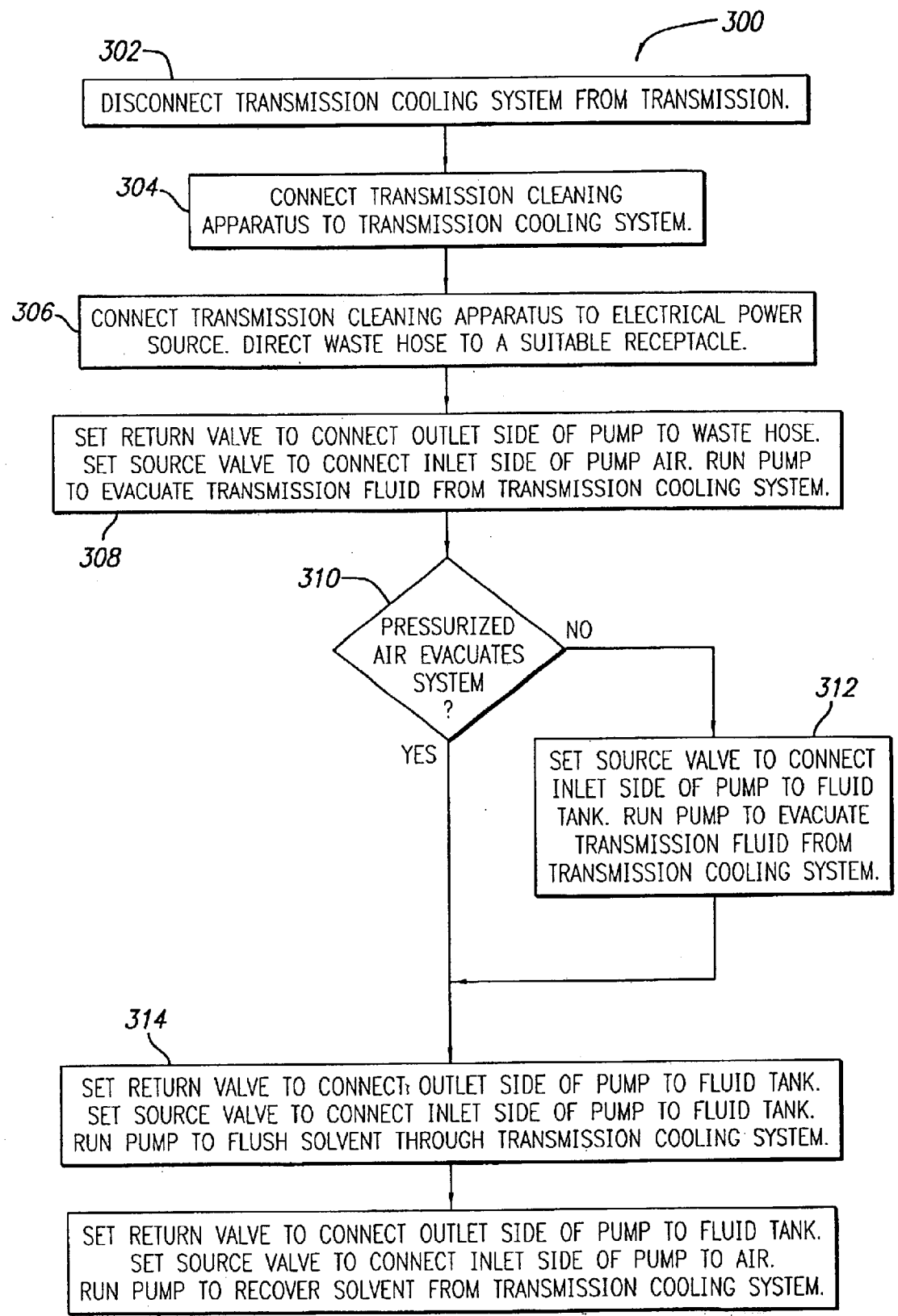
FIG. 3 illustrates a flowchart of the steps used to service a transmission cooling system using the cooler flusher system of FIG. 1A.

FIG. 3 shows flowchart 300 for describing example steps for cleaning a transmission cooling system 201 using cooler flusher system 100. Certain details and features, which are apparent to a person of ordinary skill in the art, have been left out of flowchart 300, for example, a step may consist of one or more sub-steps or may involve specialized tools, as known in the art.

As shown in FIG. 3, step 302 of flowchart 300 comprises disconnecting transmission cooling system 201 from a vehicle's transmission. For example, the transmission fluid lines may both be disconnected at the oil cooler of transmission cooling system 201. Subsequent to step 302, inlet and outlet ports of transmission cooling system 201 are available for connecting to pressure hose 102 and return hose 104 of cooler flusher system 100.

Step 304 of flowchart 300 comprises connecting cooler flusher system 100 to transmission cooling system 201. Pressure hose 202 may be connected to either inlet port or outlet port of transmission cooling system 201 using hydraulic connector 203. Return hose 204 is connected to the other port of transmission cooling system 201 using hydraulic connector 205. Thus, subsequent to step 304, transmission cooling system 201 has its inlet port connected to pressure hose 202 and its outlet port connected to return hose 204 of cooler flusher system 100.

Next, in step 306, cooler flusher system 100 is connected to a source of electrical power and waste hose 206 is directed to a suitable receptacle. For example, power cables 116 of cooler flusher system 100 shown in FIG. 1A can be connected to the vehicle's battery. Power cables 116 may also be connected, for example, to any automobile battery or power source. The free end of waste hose 206 can be placed, for example, in an auto service shop's hydraulic fluid recycling receptacle. Subsequent to step 306 of flowchart 300, then, cooler flusher system 100 is connected to a source of power for pump 238 of cooler flusher system 100, waste hose 206 is properly placed for collection of transmission fluid, and cooler flusher system 100 is connected to transmission cooling system 201 so that cleaning of transmission cooling system 201 may commence.

Step 308 of flowchart 300 comprises setting source valve 222 and return valve 224 to configure cooler flusher system 100 for evacuating transmission fluid from transmission cooling system 201. Return valve 224 is set to the "evacuate" position to direct flow from return hose 204 to waste hose 206. Source valve 222 is then set to the "air/recover" position to direct a flow of air into pressure hose 202. Power switch 132, shown in FIG. 1D, is then set to the "on" position to start pump 238 of cooler flusher system 100. The pump can be run for a sufficient length of time to remove substantially all the transmission fluid from transmission cooling system 201. For example, waste hose 206 can be made of a transparent material suitable for viewing whether transmission fluid or air is flowing through waste hose 206. When it is clear that substantially all transmission fluid has been removed from transmission cooling system 201, power switch 132 is set to the "off" position to stop pump 238 of cooler flusher system 100.

If, during step 308 of flowchart 300, it becomes apparent that the flow of pressurized air is insufficient to satisfactorily evacuate transmission fluid from transmission cooling system 201, an alternative mode of operation of cooler flusher system 100 may be followed. Observation of whether flow of pressurized air is insufficient to satisfactorily evacuate transmission fluid from transmission cooling system 201 is illustrated in flowchart 300 by decision step 310. The alternative mode of operation is shown in flowchart 300 as step 312. At step 310, if it is observed that flow of pressurized air is sufficient to satisfactorily evacuate transmission fluid from transmission cooling system 201, then cleaning of transmission cooling system 201 proceeds with step 314 directly after step 308. If, at step 310, it is observed otherwise that flow of pressurized air is insufficient to satisfactorily evacuate transmission fluid from transmission cooling system 201, then cleaning of transmission cooling system 201 can proceed with step 312 directly after step 308.

Step 312 of flowchart 300 comprises setting source valve 222 to the "flush" position to direct a flow of solvent into pressure hose 202. It should be noted that return valve 224 is already set to the "evacuate" position to direct flow from return hose 204 to waste hose 206 as part of step 308. Power switch 132 is then set to the "on" position to start pump 238 of cooler flusher system 100. Pump 238 can be run for a sufficient length of time to remove substantially all the transmission fluid from transmission cooling system 201. When it is observed, for example, by viewing through transparent waste hose 206, that substantially all transmission fluid has been removed from transmission cooling system 201, power switch 132 is set to the "off" position to stop pump 238 of cooler flusher system 100. Accordingly, after step 308, or alternatively, after steps 308 and 312, transmission cooling system 201 has been substantially cleared of transmission fluid and is ready for cleaning.

Step 314 of flowchart 300 comprises setting source valve 222 and return valve 224 to configure cooler flusher system 100 for cleaning transmission cooling system 201 by flushing it with solvent. Return valve 224 is set to the "flush" position to direct flow from return hose 204 to fluid tank 208. Source valve 222 is then set to the "flush" position to direct a flow of fluid from fluid tank 208 to pressure hose 202. Power switch 132 is then set to the "on" position to start pump 238 of cooler flusher system 100. Solvent is then continuously cycled through transmission cooling system 201 and fluid tank 208 of cooler flusher system 100. Pump 238 of cooler flusher system 100 can be run for a sufficient length of time to remove substantially all contamination and blockage from transmission cooling system 201. For example, a period of 5 to 10 minutes has been determined to be sufficient in most cases to adequately clean a typical transmission cooling system. An alternative to using a predetermined period of time for running pump 238 of cooler flusher system 100 is to measure the flow of solvent through flow meter 228 and stop pump 238 according to various methods utilizing such measurement. For example, one method is to measure improvement in the flow through flow meter 228. As long as flow is improving, i.e. increasing, solvent is cycled through transmission cooling system 201. When improvement of flow slows substantially or stops, that is taken as an indication that no more improvement is to be had, and therefore, transmission cooling system 201 has been cleaned. Another method, for example, may be to measure the numerical value of flow of solvent through flow meter 228 and compare that value to a specification for the particular transmission cooling system at hand. Typical specification values for flow through transmission cooling systems are in the range of approximately 1.0 to 2.0 gallons per minute. If flow is below the specification, then solvent is cycled through transmission cooling system 201. If flow is satisfactorily close to the specification, then that is taken as an indication that transmission cooling system 201 has been cleaned. Thus, measurement of the flow of fluid through transmission cooling system 201 can provide indications, for example, of how much time is required to clean transmission cooling system 201, whether transmission cooling system 201 is adequately clean, or whether portions of transmission cooling system 201, such as the oil cooler, need to be replaced. When it has been decided that transmission cooling system 201 has been cleaned or, alternatively, that transmission cooling system 201 cannot be adequately cleaned and needs to be replaced, power switch 132 is set to the "off" position to stop pump 238 of cooler flusher system 100. Subsequent to step 314 of flowchart 300, transmission cooling system 201 contains solvent which should be recovered to fluid tank 208 of cooler flusher system 100.

Step 316 of flowchart 300 comprises setting source valve 222 and return valve 224 to configure cooler flusher system 100 for recovering solvent from transmission cooling system 201. Return valve 224 is set to the "flush" position to direct flow from return hose 204 to fluid tank 208. Source valve 222 is set to the "air/recover" position to direct a flow of air into pressure hose 202. Power switch 132 is set to the "on" position to start pump 238 of cooler flusher system 100. Pump 238 can be run for a sufficient length of time to recover substantially all the solvent from transmission cooling system 201. When it is clear that substantially all solvent has been recovered from transmission cooling system 201, power switch 132 is set to the "off" position to stop pump 238 of cooler flusher system 100. Subsequent to step 316 of flowchart 300, transmission cooling system 201 has been cleaned or it has been decided that transmission cooling system 201 is no longer fit for service. In either case, cooler flusher system 100 is disconnected from transmission cooling system 201, and from the vehicle's battery if that was used. If transmission cooling system 201 is fit for service, a further step may be taken, for example, of flushing a small amount of transmission fluid through transmission cooling system 201 to remove residual solvent, which may be present after completion of step 316 of flowchart 300, before reconnecting transmission cooling system 201 to the transmission on the vehicle. Thus, after completion of step 316 of flowchart 300, transmission cooling system 201 is reconnected to the vehicle or a replacement transmission cooling system is provided.

Figure 4:
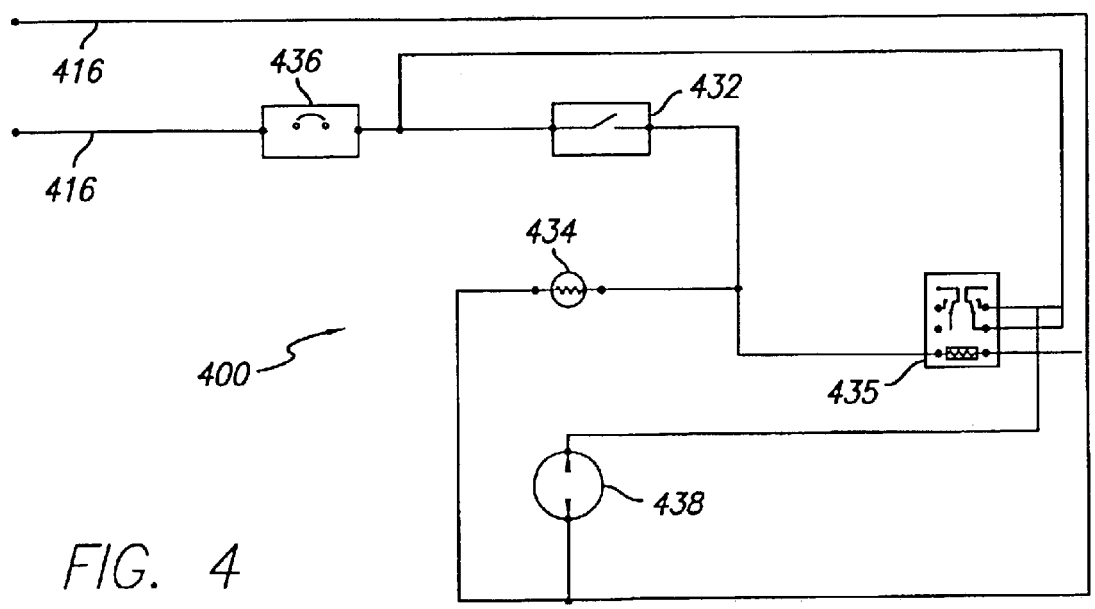
FIG. 4 illustrates an electrical schematic diagram of the cooler flusher system of FIG. 1A.

Referring now to FIG. 4, electrical schematic diagram 400 is shown for one embodiment of the present invention. Electrical schematic diagram 400 shows electrical connections of components for supplying electric power to the pump of cooler flusher system 100 according to one embodiment of the present invention.

As shown in FIG. 4, power cables 416 in electrical schematic 400 are connected to a source of electrical power suitable for operating pump 438 at the desired operating capacity. For example, the source of electrical power can be a car battery, as discussed above. Electrical schematic 400 also shows power switch 432 for controlling pump 438. Thus, pump 438 can be started by moving the position of switch 432 from "off" to "on" or stopped by moving the position of switch 438 from "on" to "off." Diagram 400 also shows indicator light 434 wired in series with switch 432 so that indicator light 434 is lit whenever switch 432 is in the "on" position. Indicator light 434 provides a safety feature for the operator to know whether power is connected when switch 432 is in the on position. Indicator light 434, for example, can be a very low power amber lamp. Switch 432 is isolated from pump 438 by relay 435 in a standard manner. Thus, switch 432 can be, for example, a toggle switch capable of handling enough power to power relay 435 and indicator light 434. Relay 435 can be, for example; a simple relay capable of handling enough power to power pump 438. Electrical schematic 400 also shows circuit breaker 436 wired in series with the source of electrical power in order to protect all electrical components of electrical schematic 400. Circuit breaker 436, for example, can be a fuse of a proper rating or a standard switch type circuit.

Thus, according to one embodiment of the present invention, cooler flusher system 100 provides a means for cleaning transmission cooling systems in which the cleaning fluid or solvent can be repeatedly and continuously flushed through the transmission cooling system in order to ensure adequate cleaning. Because of the cycling of solvent, cooler flusher system 100 provides flexibility in that the amount of cleaning can be adjusted to each particular transmission cooling system by adjusting the amount of time, that solvent is cycled through a transmission cooling system. For example, a dirtier transmission cooling system may require, and can receive, more cleaning by cycling solvent for a longer period of time. Moreover, because of cycling the solvent, cooler flusher system 100 provides more economical cleaning in that the same solvent can be effectively used for many vehicles. Cycling of solvent also avoids other disadvantages of using the cleaning liquid only once, for example wastefulness. Using the cleaning liquid only once can be wasteful because cleaning liquid is typically not completely dirty after only one use and can be used again. Reuse of cleaning fluid through cycling of solvent avoids premature disposal of cleaning fluid, which is beneficial to the environment.

Various techniques may be used for implementing the concepts of the present invention without departing from its scope. While the present invention has been described with specific reference to certain embodiments, a person of ordinary skills in art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of servicing a transmission cooling system having an inlet port and an outlet port, said method comprising the steps of:

connecting said outlet port to a receptacle;

pumping air into said inlet port to cause a first fluid in said transmission cooling system to flow out of said outlet port and into said receptacle;

cycling a second fluid through said transmission cooling system, wherein said second fluid enters through said inlet port and exits through said outlet port;

cycling said second fluid exiting through said outlet port back through said transmission cooling system; and pumping air into said inlet port to cause said second fluid in said transmission cooling system to exit through said outlet port.

2. The method of claim 1 further comprising a step of disposing said first fluid.

3. The method of claim 1 further comprising a step of filtering said second fluid prior to said step of cycling said second fluid exiting through said outlet port back through said transmission cooling system.

4. The method of claim 1, wherein a second fluid source contains said second fluid.

5. The method of claim 4, wherein said second fluid exiting said outlet port returns to said second fluid source prior to said step of cycling said second fluid exiting through said outlet port back through said transmission cooling system.

6. The method of claim 1, wherein said second fluid is a solvent.

7. A method of servicing a transmission cooling system having an inlet port and an outlet port, said method comprising steps of:

connecting said outlet port to a receptacle;

pumping air into said inlet port to cause a first fluid in said system to flow out of said outlet port and into said receptacle;

cycling a second fluid through said transmission cooling system, wherein said second fluid enters through said inlet port and exits through said outlet port;

measuring flow of said second fluid after exiting said outlet port;

cycling said second fluid exiting through said outlet port back through said transmission cooling system; and pumping air into said inlet port to cause said second fluid in said transmission cooling system to exit through said outlet port.

8. The method of claim 7 further comprising a step of disposing said first fluid.

9. The method of claim 7 further comprising a step of filtering said second fluid prior to said step of cycling said second fluid exiting through said outlet port back through said transmission cooling system.

10. The method of claim 7, wherein a second fluid source contains said second fluid.

11. The method of claim 10, wherein said second fluid exiting said outlet port returns to said second fluid source prior to said step of cycling said second fluid exiting through said outlet port back through said transmission cooling system.

12. The method of claim 7, wherein said second fluid is a solvent.

* * * * *